United States Patent
Muchsel et al.

(10) Patent No.: US 11,797,994 B2
(45) Date of Patent: Oct. 24, 2023

(54) SYSTEMS AND METHODS FOR A SECURE PAYMENT TERMINAL WITHOUT BATTERIES

(71) Applicant: Maxim Integrated Products, Inc., San Jose, CA (US)

(72) Inventors: Robert Michael Muchsel, Addison, TX (US); Gregory Guez, Coppell, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 152 days.

(21) Appl. No.: 15/647,533

(22) Filed: Jul. 12, 2017

(65) Prior Publication Data

US 2018/0018673 A1    Jan. 18, 2018

Related U.S. Application Data

(60) Provisional application No. 62/362,804, filed on Jul. 15, 2016.

(51) Int. Cl.
*G06Q 20/40* (2012.01)
*G06F 21/75* (2013.01)
(Continued)

(52) U.S. Cl.
CPC ..... *G06Q 20/4016* (2013.01); *G06F 21/6245* (2013.01); *G06F 21/73* (2013.01);
(Continued)

(58) Field of Classification Search
None
See application file for complete search history.

(56) References Cited

U.S. PATENT DOCUMENTS

| 7,757,083 B2 * | 7/2010 | Devadas | G06F 21/31 |
| | | | 713/168 |
| 7,880,248 B1 * | 2/2011 | Pham | H01L 23/573 |
| | | | 257/417 |

(Continued)

OTHER PUBLICATIONS

Maes R., Tuyls P., Verbauwhede I. (2009) Low-Overhead Implementation of a Soft Decision Helper Data Algorithm for SRAM PUFs. In: Clavier C., Gaj K. (eds) Cryptographic Hardware and Embedded Systems—CHES 2009. CHES 2009. Lecture Notes in Computer Science, vol. 5747. Springer, Berlin, Heidelberg (Year: 2009).*

(Continued)

*Primary Examiner* — Jacob C. Coppola
(74) *Attorney, Agent, or Firm* — North Weber & Baugh LLP; Michael North

(57) ABSTRACT

Various embodiments of the present disclosure provide systems and methods for securing electronic devices, such as financial payment terminals, to protect sensitive data and prevent unauthorized access to confidential information. In embodiments, this is achieved without having to rely on the availability of backup energy sources. In certain embodiments, tampering attempts are thwarted by using a virtually perfect PUF circuit and PUF-generated secret or private key within a payment terminal that does not require a battery backup system and, thus, eliminates the cost associated with common battery-backed security systems. In certain embodiments, during regular operation, sensors constantly monitor the to-be-protected electronic device for tampering attempts and physical attack to ensure the physical integrity.

20 Claims, 12 Drawing Sheets

(51) Int. Cl.

| | | |
|---|---|---|
| *G06F 21/81* | (2013.01) | |
| *H04L 9/08* | (2006.01) | |
| *G06Q 20/20* | (2012.01) | |
| *G06Q 20/38* | (2012.01) | |
| *G06F 21/73* | (2013.01) | |
| *G06F 21/62* | (2013.01) | |
| *H04L 9/32* | (2006.01) | |

(52) U.S. Cl.
CPC .............. *G06F 21/75* (2013.01); *G06F 21/81* (2013.01); *G06Q 20/20* (2013.01); *G06Q 20/382* (2013.01); *G06Q 20/3823* (2013.01); *G06Q 20/3829* (2013.01); *H04L 9/0866* (2013.01); *H04L 9/3278* (2013.01); *G06F 2221/2143* (2013.01); *G06Q 2220/00* (2013.01); *H04L 2209/56* (2013.01)

(56) References Cited

U.S. PATENT DOCUMENTS

| | | | |
|---|---|---|---|
| 8,525,169 B1 | 9/2013 | Edelstein et al. | |
| 8,637,985 B2* | 1/2014 | Bindrup | H01L 23/57 |
| | | | 257/723 |
| 8,756,438 B2 | 6/2014 | Devadas et al. | |
| 8,971,527 B2 | 3/2015 | BrightSky et al. | |
| 9,048,834 B2* | 6/2015 | Li | H03K 19/17768 |
| 9,088,278 B2* | 7/2015 | Pfeiffer | H03K 19/003 |
| 9,225,512 B1 | 12/2015 | Trimberger | H04L 9/0866 |
| 9,485,094 B1* | 11/2016 | Parvarandeh | H04L 9/0866 |
| 9,502,356 B1* | 11/2016 | Parvarandeh | H01L 23/544 |
| 9,832,027 B2 | 11/2017 | Loisel et al. | |
| 10,771,246 B2* | 9/2020 | Kwak | H04L 9/0869 |
| 2006/0081497 A1* | 4/2006 | Knudsen | G06F 21/71 |
| | | | 206/701 |
| 2008/0106605 A1* | 5/2008 | Schrijen | G06F 21/60 |
| | | | 348/207.99 |
| 2009/0083833 A1* | 3/2009 | Ziola | G06F 21/31 |
| | | | 726/2 |
| 2010/0085075 A1* | 4/2010 | Luzzi | H04L 9/0866 |
| | | | 326/8 |
| 2010/0176920 A1* | 7/2010 | Kursawe | G06F 21/602 |
| | | | 340/5.74 |
| 2012/0047374 A1* | 2/2012 | Klum | G06F 21/86 |
| | | | 713/192 |
| 2012/0050998 A1* | 3/2012 | Klum | G06F 21/86 |
| | | | 361/720 |
| 2012/0137119 A1* | 5/2012 | Doerr | G06F 15/167 |
| | | | 713/100 |
| 2012/0183135 A1* | 7/2012 | Paral | H04L 9/0866 |
| | | | 380/44 |
| 2012/0185636 A1* | 7/2012 | Leon | H01L 23/576 |
| | | | 711/102 |
| 2013/0044874 A1* | 2/2013 | Murray | H04L 9/0866 |
| | | | 380/44 |
| 2013/0141137 A1* | 6/2013 | Krutzik | H03K 19/173 |
| | | | 326/8 |
| 2013/0156183 A1* | 6/2013 | Komano | H04L 9/0861 |
| | | | 380/44 |
| 2014/0042628 A1* | 2/2014 | Edelstein | H01L 23/52 |
| | | | 257/758 |
| 2014/0185795 A1* | 7/2014 | Gotze | H04L 9/0861 |
| | | | 380/44 |
| 2014/0225639 A1* | 8/2014 | Guo | H03K 3/84 |
| | | | 326/8 |
| 2014/0258736 A1* | 9/2014 | Merchan | G06F 21/62 |
| | | | 713/193 |
| 2015/0195088 A1* | 7/2015 | Rostami | G09C 1/00 |
| | | | 380/28 |
| 2016/0080158 A1* | 3/2016 | Gehrer | G09C 1/00 |
| | | | 380/28 |
| 2016/0182045 A1* | 6/2016 | Mai | G09C 1/00 |
| | | | 326/8 |
| 2017/0048072 A1* | 2/2017 | Cambou | G09C 1/00 |
| 2017/0126414 A1* | 5/2017 | Goel | G06F 3/0622 |
| 2017/0365316 A1* | 12/2017 | Wang | G11C 11/1675 |
| 2018/0159685 A1* | 6/2018 | Kwak | H04L 9/0866 |

OTHER PUBLICATIONS

Herder et al., Physical Unclonable Functions and Applications: A Tutorial, Proceeding of the IEEE, vol. 102, No. 8. (Year: 2014).*
Yu et al., Secure and Robust Error Correction for Physical Unclonable Functions, IEEE Design & Test of Computers. (Year: 2010).*
Maiti et al., "Improved Ring Oscillator PUF: An FPGA-friendly Secure Primitive," International Association for Cryptologic Research 2010, Journal of Cryptology, 24: 375-397. (Year: 2011).*
Du et al., "A Novel Technique for Ring Oscillator Based PUFs to Enroll Stable Challenge Response Pairs," 2014 IEEE International Conf. on Computer and Information Tech., IEEE, all pages. (Year: 2014).*
Suh et al., "Physical Unclonable Functions for Device Authentication and Secret Key Generation," DAC 2007, Jun. 4-8, all pages. (Year: 2007).*
Maiti et al., "The Impact of Aging on a Physical Unclonable Function," IEEE Transactions on Very Large Scale Integration (VLSI) Systems, vol. 22, No. 9, IEEE, all pages. (Year: 2014).*
Bosch et al., "Efficient Helper Data Key Extractor on FPGAs," CHES 2008, LNCS 5154, pp. 181-197, International Association for Cryptologic Research 2008, all pages. (Year: 2008).*
Forte et al., "Improving the Quality of Delay-Based PUFs via Optical Proximity Correction," IEEE Transactions on Computer-Aided Design of Integrated Circuits and Systems, vol. 32, No. 12, Dec. 2013, IEEE, all pages. (Year: 2013).*
U.S. Appl. No. 62/240,991, filed Oct. 13, 2015 (25pgs).
Office action dated Jan. 3, 2023, dated Nov. 24, 2022 in the Chinese patent application No. 201710580809.X, (32 pgs).
Response to office action filed Jan. 20, 2023 in the Chinese patent application No. 201710580809.X, (2 pgs).
Notice of Allowance dated Jun. 28, 2023 in related Chinese Patent Application No. 201710580809.X, (5 pgs).

* cited by examiner

SYSTEMS AND METHODS FOR A SECURE PAYMENT TERMINAL WITHOUT BATTERIES

CROSS REFERENCE TO RELATED APPLICATIONS

This application is related to and claims the priority benefit of and commonly-assigned U.S. Provisional Patent Application No. 62/362,804, filed on Jul. 15, 2016, titled "Systems and Methods for a Secure Payment Terminal without Batteries," listing inventors Robert Muchsel and Gregory Guez, which application is herein incorporated by reference in its entirety.

TECHNICAL FIELD

The present disclosure relates to secure electronic systems and, more particularly, to systems and methods for protecting sensitive data in financial payment terminals to prevent unauthorized access. The present invention further relates to secure systems for identification and authentication and, more particularly, to systems, devices, and methods for random encryption key generation with Physically Unclonable Functions (PUFs).

DESCRIPTION OF THE RELATED ART

Financial payment terminal devices process millions of transactions every day. Due to the risk and cost associated with exposure of payment information (e.g., credit card information), payment terminals must meet rigorous security standards to be accepted by banks, issuers, and credit card companies that require that critical information be encrypted at all times, and that secret keys be deleted in the event the terminal is attacked by potential intruders.

Traditionally, this means that active components in the terminal have to continuously and actively monitor for signs of intrusion, and that secret keys and other sensitive information usually stored in memory devices within a computer system are erased from volatile memory upon detecting signs of a potential attack. Wiping the decryption key and/or the encryption memory renders the attack futile, as it makes it impossible for potential intruders to decipher the encrypted information and, thus, prevents capture of secret information by adversaries.

Since volatile memory has to be employed, typically, a backup battery is necessary to provide continuous power to hold the decryption key in memory, for example, in circumstances when system power becomes temporarily or permanently unavailable, such as during transport or for portable payment terminals. In addition, security monitoring systems containing protective electronic meshes and other active parts are electrically operated and designed to detect physical tampering in situations when the financial terminal is powered down or experiences an unexpected power outage. In other words, a continuously active monitoring system remains in control of the physical integrity of the device.

In addition, payment terminals and other devices containing secure microcontrollers that use battery-backed security monitoring systems have an average battery lifetime of about seven years. This is appropriate in most instances as hardware security modules are generally obsolete and replaced within that time period, such that the battery lifetime exceeds the actual operating time of the device in the field.

However, devices with rather long lifetimes, such as smart meters, are expected to operate in the field for 30 years or more and practically without requiring any maintenance or, at least, with as little maintenance as possible. Given that even the most advanced batteries have a less than 10-year lifetime, this shortcoming renders protection of these devices ineffective once their batteries require replacement and power must be interrupted for a certain period of time to perform maintenance work. Similarly, for industrial devices that are located in remote places, such as oil or gas pipelines that are designed to operate as no-maintenance devices, replacing batteries in the field is not a viable solution due to the extremely high maintenance and support cost and, more importantly, security issues associated with powering down and opening a secure device that is intended to remain unopened.

Currently, no practical solutions exist to ensure around-the-clock protection for high-security and long-life devices. Once the device is shut down, it is exposed and there is no security at all. Furthermore, energy sources, such as backup batteries, can add significant cost to the system for various reasons including increased component cost, maintenance cost due to limited battery lifetime, susceptibility to environmental factors, and the cost of obtaining proper certification (e.g., for use in airplanes).

Some existing approaches reduce power consumption by an order of magnitude or more by re-engineering intrusion sensors and memory components. More advanced approaches utilize active energy harvesting methods that power the intrusion sensors and the key memory. However, even the most sophisticated approaches are not always practical as they rely on the presence of energy sources, such as temperature gradients, to ensure uninterrupted and continuous power, which may not always be available.

What is needed are systems and methods that provide a high level of uninterrupted security that prevents unauthorized access to sensitive data without the cost associated with common battery-backed security systems.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document the terms "variation" and "mismatch" are used interchangeably. "PUF elements" and "PUF devices" include physical, chemical, and other elements recognized by one of skilled in the art. The terms "key," "secret key," and "secret" are used interchangeably as are the terms "mesh, mesh envelope, and mesh circuit." The term "secure device" includes secure microcontrollers, secure storage devices, and other secure elements recognized by one of skilled in the art.

It shall be noted that: (1) certain steps may optionally be performed; (2) steps may not be limited to the specific order set forth herein; (3) certain steps may be performed in different orders; and (4) certain steps may be done concurrently.

Furthermore, while embodiments described herein are described in the context of financial payment terminals, one skilled in the art shall recognize that the teachings of the present disclosure are not limited to payment terminals and may equally be applied to protect other forms of secure information, e.g., in the military, access control, IP protection, health, and medical fields, that may take advantage of the principles herein and be securely implemented without resorting to backup batteries.

Figure 1:
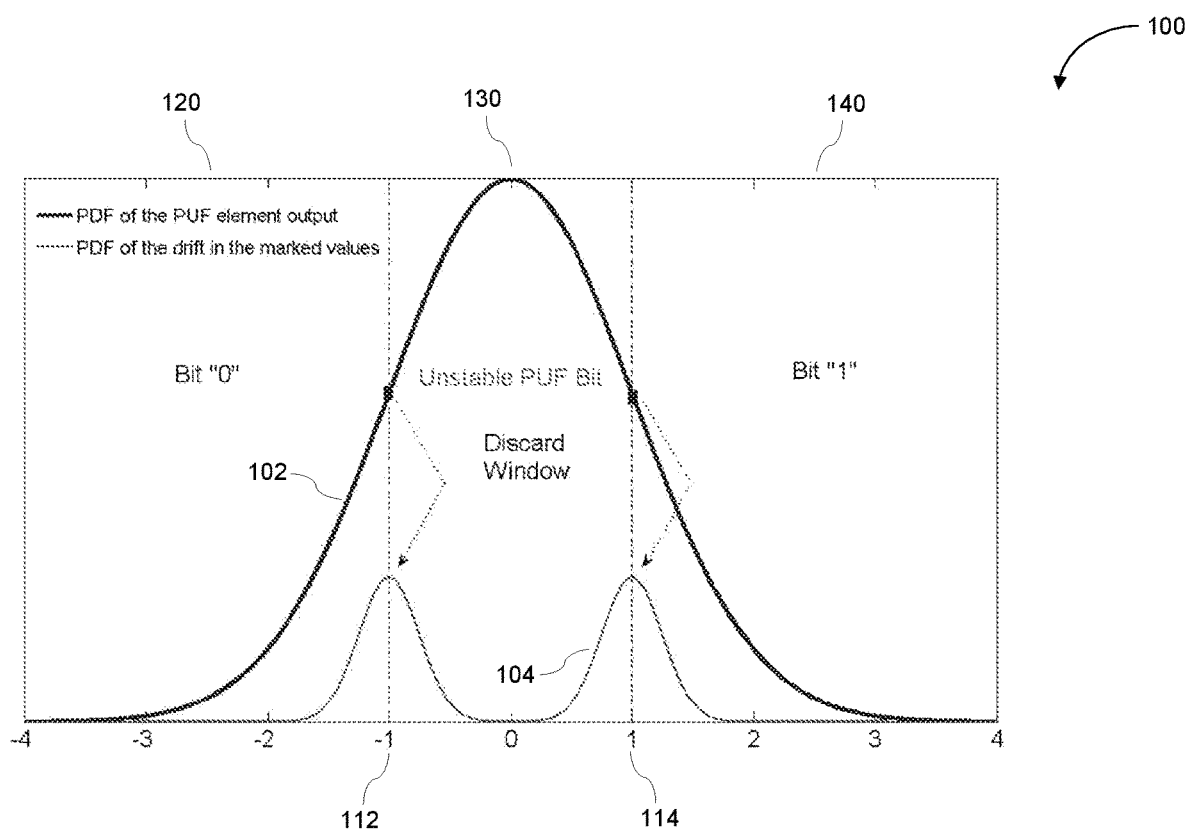
FIG. 1 illustrates the effect of drift on a normalized Gaussian distribution of PUF element outputs representing mismatch values.

FIG. 1 illustrates the effect of drift on a normalized Gaussian distribution of PUF element outputs representing mismatch values. Mismatch in PUF elements may be caused by a number of factors, including variations in doping concentrations, gate oxide thickness, and tolerances in geometry that result from imperfect semiconductor manufacturing processes during the manufacturing of the MOS devices. Mismatch information of PUF elements existing in physical device may be obtained in various forms, such as the form of electrical, magnetical, or optical information.

In general, PUF bits are selected from a given population of mismatch values (e.g., threshold voltages) of measured PUF elements based on the polarity. In FIG. 1 PUF elements with small mismatch values are typically discarded to ensure stability and prevent drift from causing an unwanted flipping of bits. Drift, as used herein, maybe any change in environmental variables, such as temperature drift, noise, and the like. As a result, much of the useful PUF elements in a distribution are typically discarded in favor of achieving the desired stability. In detail, the upper curve in FIG. 1 is a mismatch distribution, whereas the lower curve is showing distribution of the drift of any given mismatch. This information may be derived from measurements on PUF elements.

Let us consider a PUF element with a mismatch located at the $+1\sigma$ 112 or $-1\sigma$ 114 points on distribution 102 location, then a mismatch value located in region 120 on the left or negative side of the distribution can be considered sufficiently large to ensure a bit "0." Likewise, a mismatch value located in region 140 on the right or positive side of the distribution can be considered sufficiently large to ensure a bit "1." However, the value of a mismatch located in the mid-section 130 of distribution 102 is likely to heavily vary if affected by one or more environmental variables, as shown by curve 104.

Since the skirt of curve 104 is relatively closer to the center of the distribution, this increases the likelihood of an unwanted PUF key bit flip. For example, if any mismatch values outside of the $+/-1\sigma$ band 130 is considered stable, all PUF elements associated with values under curve 102 falling within the $+/-1\sigma$ window 130, i.e., 68% of the population of the Gaussian distribution 102 will have to be discarded. It is noted that other distributions cannot eliminate the problem as they produce similar comparable results. Advantageously, the methods and systems presented herein are independent of the type of specific statistical distribution of any sampled group of actual components.

In short, in order to achieve a desired bit error rate, e.g., to allow for operation within a wider temperature range, a relatively large fraction of useful PUF elements must be discarded from the overall population 102 to account for potential drift and ensure stable PUF bits. However, the improvement in error rate comes at the expense of a reduction in the number of usable PUF elements that are capable of generating PUF bits. Intuitively, the more PUF elements located close to the center of the distribution are used, the smaller will be their mismatch and the more unrepeatable PUF bits will be included in the selection, resulting in a larger error rate.

Therefore, it would be desirable to have systems and methods to avoid this trade-off between utilization and error rate such that generated PUF key bits remain insensitive to environmental errors without affecting the overall utilization rate of available PUF elements.

Figure 2:
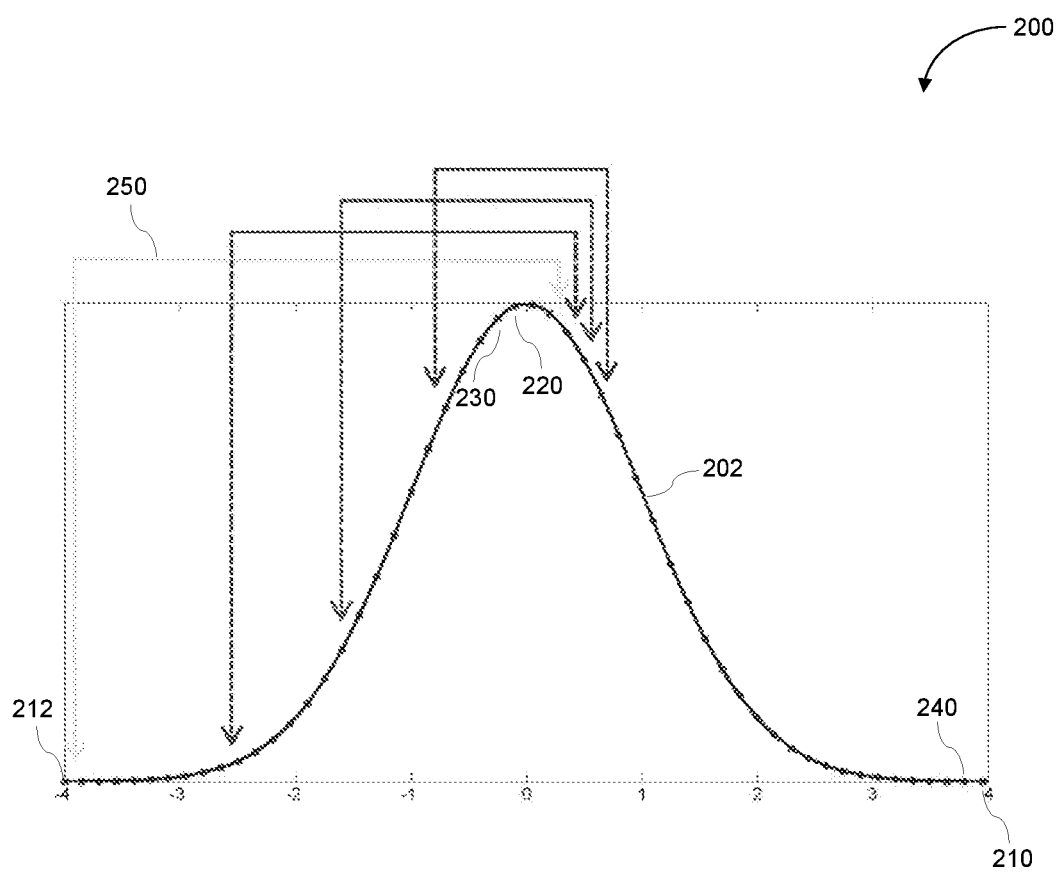
FIG. 2 illustrates an exemplary pairing process for generating PUF key bits using an exemplary Gaussian distribution of sorted mismatch values, according to various embodiments of the invention.

FIG. 2 illustrates an exemplary pairing process for generating PUF key bits using an exemplary Gaussian distribution of sorted, raw PUF element mismatch data, according to various embodiments of the invention. Gaussian distribution 202 comprises 256 measured mismatch values of a 16×16 bit array of 256 PUF elements (not shown). Each PUF element is associated with its own mismatch value that is output by the PUF element array. In embodiments, the 256 mismatch values representing 256 measured samples are sorted by magnitude and polarity and combined to pairs in order to create random values from differences in the mismatch values in a pair 250.

In detail, the rightmost value in example in FIG. 2 is the first PUF element 210, and the leftmost value is the 256$^{th}$ PUF element 212. According to the distribution, the first 210 and 256$^{th}$ 212 PUF element each have a relatively large mismatch value with opposite polarity. In contrast, the 129$^{th}$ PUF element 220 has a mismatch value of about zero. It is understood that by this sorting method—assuming a sufficiently large population of mismatch values—about half of the values obtained will be positive, while the other half will be negative.

In embodiments, once the mismatch values for the PUF elements are sorted form 1 to n (here n=256), they are paired in the following manner: The PUF element with the most positive mismatch, i.e., the first PUF element 210 on the far right positive side of distribution 202, is paired with the PUF element with the least negative mismatch on the negative side close to the center region of distribution 202, i.e., the 129th PUF element 220 to construct the first paired value. Next, the second most positive PUF element, i.e., the second PUF element 240, is paired with the second least negative PUF element 230, i.e., the 130th PUF element, so as to obtain the second paired result, and so on.

This paring method (called non-recursive herein) continues until all 256 mismatch values in distribution 202 are paired. This results in the generation of a total number of 128 random paired values. The pairing information is different from part to part. Since the measured data are unique to each part, this approach desensitizes the PUF key bits to the variations over different parts, wafers, lots or packages, etc.

In mathematical form, for n elements, paring is performed for i=1 to n, by pairing the i$^{th}$ element with the (n/2+i)$^{th}$ element. In embodiments, the pairing of mismatch values comprises a subtraction on pairs of mismatch values, such that the combination of a relatively large number with smaller number into a pair creates 128 random and relatively large difference values. In embodiments, a selection circuit (not shown) may be implemented to select and quantify differences in mismatch values between pairs of devices, e.g., by assigning a numerical value to the difference between each pair.

In embodiments, to maintain the randomness of key bit generation in addition to maintaining stability, the value obtained from the subtraction is randomly switched to generate the random 0 or 1 value. This may be accomplished, for example, by randomly subtracting the two numbers in the pair from each other, i.e., by randomly selecting the minuend and subtrahend prior to performing the subtraction operation.

Assuming a 1-to-256 index that represents the physical placement of the mismatches of the physical PUF elements, once sorted, the index will be different from the original index. In one embodiment, prior to subtraction, each element is assigned an index number based on location, and if the first index number is greater than the second, the first number is selected as the minuend. Conversely, if the first index number is less than the second, the first number is selected as subtrahend. In other words, the selection of the minuend is also based on the mismatch of the particular chip as represented by the index number, thereby, taking advantage of the randomness characteristic of the PUF itself and preventing an unwanted contamination of the randomness. One skilled in the art will appreciate that other mapping and sorting schemes may be utilized.

Figure 3A:
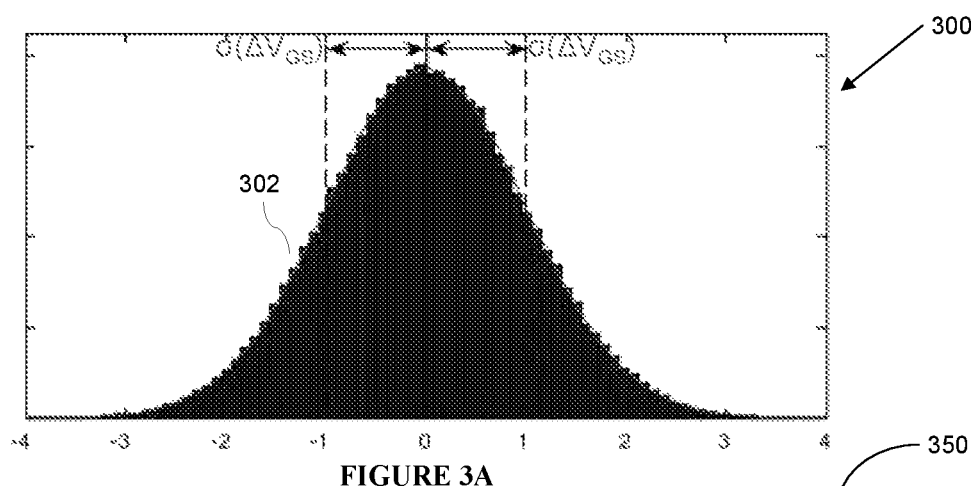
FIGS. 3A and 3B illustrate a transformation of an exemplary measured and normalized Gaussian distribution of Vgs mismatch in MOS devices into an exemplary bi-modal distribution of paired mismatch data using sorting, according to various embodiments of the invention.
Figure 3B:
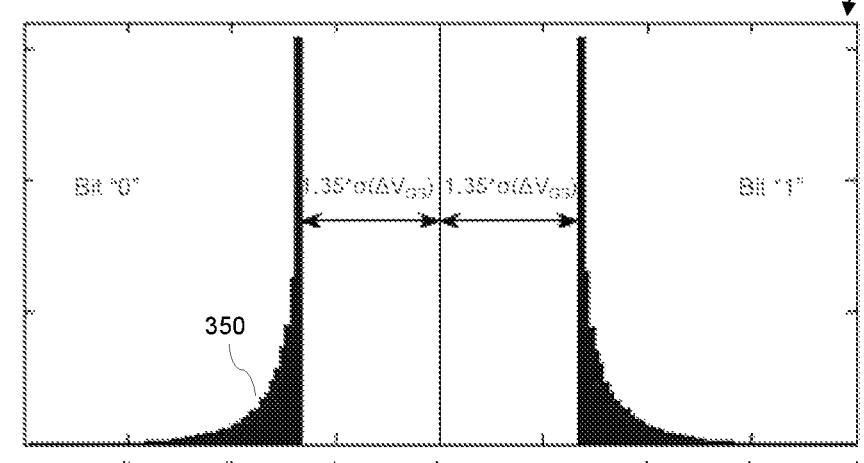

FIGS. 3A and 3B illustrate a transformation of an exemplary measured and normalized Gaussian distribution of mismatch values into an exemplary bi-modal distribution, according to various embodiments of the invention. Mismatch is typically represented by a number, e.g., a voltage difference AVGs. In embodiments, the pairing of identified or measured and sorted elements transforms the histogram of the original Gaussian distribution 302 of Vgs mismatch in MOS devices into bi-modal distribution 350 comprising paired mismatch data. Each sample in bi-modal distribution 350 is derived from a set of paired mismatch data points in distribution 302. As a result, the generation of, e.g., a 128 bit PUF key requires 256 PUF elements that sample 256 mismatch data points, because two elements that are paired are combined to generate a single PUF bit.

Graph 300 in FIG. 3A is the original Gaussian distribution 302 of mismatch prior to pairing. Mismatch distribution 302 may be obtained from measurements, e.g., made at ambient temperature at wafer sort. Graph 350 in FIG. 3B shows the bi-modal distribution 350 having an increased margin of at least 1.35 times the standard deviation of distribution 302. In embodiments, once pairing is accomplished, the two numbers in each pair are subtracted from each other in order to generate a relatively large difference value. For example, if the subtraction produces in a positive number, the resulting bit will be assigned a value of "1," whereas, if the subtraction results in a negative number, the bit will be assigned a value of "0." By virtue of the subtraction operation, the large difference value widens the safety margin and, thus, ensures that the result is not affected by the effects of drift.

The effect of combining paired PUF elements in this manner is to convert the Normal distribution 302 of the Vgs mismatch into a bi-modal distribution 350 that contains no Vgs values within an exclusion range located around the center of distribution 350. This satisfies the criterion for a minimum separation of pairs of PUF elements intended to ensure the generation of stable PUF bits due to an improved expected error rate, as will be discussed next.

Figure 4:
FIG. 4 illustrates expected margins as a function error rates, according to various embodiments of the invention.

FIG. 4 illustrates expected margins as a function error rates, according to various embodiments of the invention. Ideally, the error rate, i.e., the probability of misreading a single bit that is caused by a change in polarity, for example due to environmental effects, would be zero. Empirical data, however, suggests that the failure rate for a 128 bit key is 350 parts per million (ppm). Similarly, for a 256 bit key, the failure rate is found to be 650 ppm. And, in some applications, the 1.35σ separation for a typical failure rate of a 128 bit key may still not provide an adequate margin.

For example, as shown in FIG. 4, a tenfold lower failure rate 402 from 1 ppm to 100 parts per billion (ppb) for a 128 bit key requires an increase in separation by 0.15 standard deviations, here, from 1.65 to 1.8. A one hundredfold lower failure rate from 1 ppm to 10 ppb for the same 128 bit key requires an increase in separation by 0.25 standard deviations, and so on. It is noted that a 100% utilization of PUF elements is not required for purposes of the invention. Advantageously, systematic errors do not affect the outcome, as these errors are inherent to the entire system and apply equally to all mismatch pairs. Errors caused by noise are also negligible when compared with the magnitude of the differences being detected.

Figure 5:
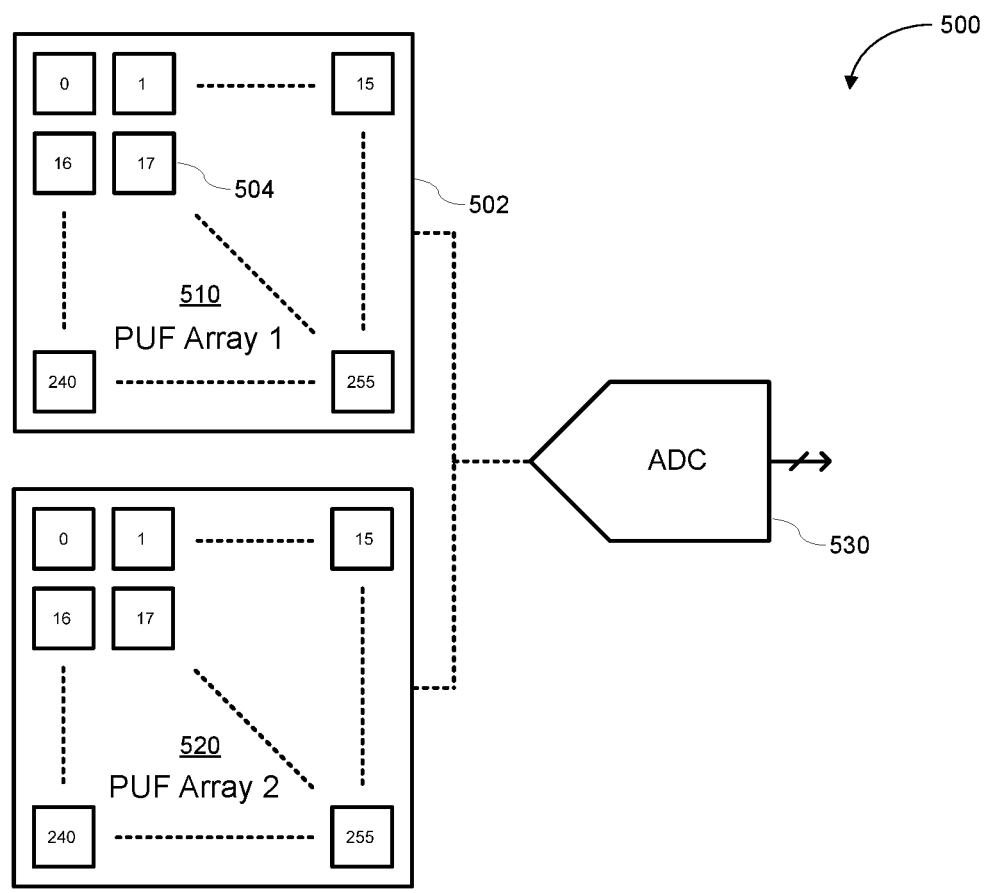
FIG. 5 illustrates an exemplary implementation of a system to generate a stable 128 bit PUF key by using recursive pairing, according to various embodiments of the invention.

In embodiments, in order to increase stability even further than by the pairing scheme discussed with respect to FIG. 2 and FIG. 3, pairing of analog PUF elements is performed in a recursive manner, as will be explained with reference to FIG. 5, which illustrates an exemplary implementation of a system to generate a stable 128 bit PUF key by using recursive pairing, according to various embodiments of the invention. System 500 comprises chips 502, 504, and ADC 530. A person skilled in the art will appreciate that system 500 may comprise additional components that analyze, convert, amplify, process, and secure data, including logic devices and power sources known in the art.

The inventors envision that mismatch values are processed by any mathematical operation, e.g., by multiplication instead of a simple subtraction. In addition, any number of mismatch values may be selected and combined for processing. For example, three mismatch values may be processes to generate a PUF key. In addition, different algorithms may be used on different physical devices in order to decrease detectability and, thus, enhance security.

Figures 6A, 6B:
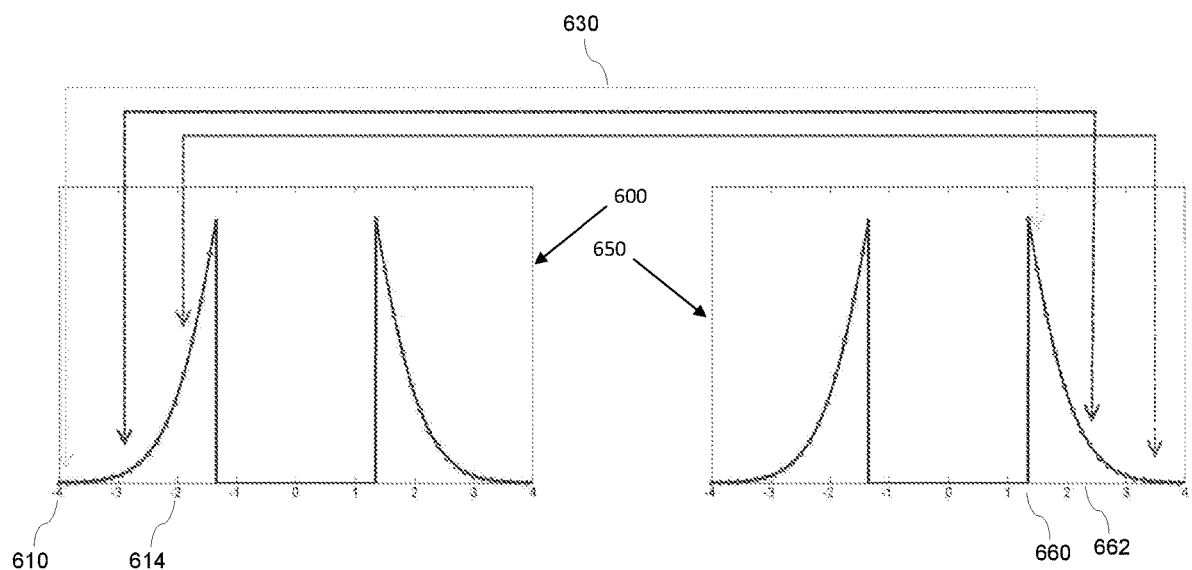
FIGS. 6A and 6B illustrate an exemplary recursive pairing of two bi-modal distributions of paired mismatch data that result from transformations of Gaussian distributions, according to various embodiments of the invention.

Chips 502, 504 comprise two identical but independent 16×16 PUF arrays 510, 520 that may be used to generate two independent bi-modal distributions shown in FIGS. 6A and 6B. As depicted therein, the separation of paired mismatch elements in FIGS. 6A and 6B is +/−1.35σ, i.e., the same value as in FIG. 3 that was obtained by the pairing process discussed with respect to FIGS. 2 and 3.

Returning to FIG. 5, each PUF array 510, 520 is designed to pair elements 504 as previously described. While only two arrays are shown in FIG. 5, the inventor envisions that any number of possible arrays and any combination mane be used. In embodiments, once PUF elements 504 are sorted for each array form one to n (e.g., n=256), they are paired in the following manner:

The most positive mismatch from one bi-modal distribution (e.g., number 1 of array 1 510) is paired with the least negative mismatch from the other bi-modal distribution (e.g., number 65 of array 2 520) to obtain the first recursively paired result. The second most positive mismatch from the first bi-modal distribution (e.g., number 2 of array 1 510) is paired with the least negative mismatch from the second bi-modal distribution (e.g., number 66 of array 2 520) until all 128 paired values are re-paired. In other words, for n elements 504, paring is performed for i=1 to n/2, by pairing the $i^{th}$ element of array 1 with the $(i+n/2)^{th}$ element of array 2, and for i=n/2+1 to n by pairing the $i^{th}$ element of array 1 with the $(i-n/2)^{th}$ element of array 2.

This method provides two elements for each bi-modal distribution, i.e., four elements from which 0 and 1 key bits may be generated. In embodiments, similar to FIG. 2, the paired values are subtracted and random switching is applied to generate values of either 0 or 1, for example, by assign a 0 or 1 value based on an index, as before. However, compared the non-recursive method of FIG. 2, the recursive method is expected to yield relatively larger separations, i.e., margins.

In embodiments, the separation for the recursive method is a least twice as large as for the non-recursive method. For example, as can be seen in FIG. 6B, the pairing of a mismatch associated with a σ of −4 610 with a mismatch associated with a σ of +1.35 660 results in a relatively wide total separation margin of 5.35, which is almost four times larger than 1.35 for that particular pair 620. Even when taking into account the non-linear nature of bi-modal distributions 600, 650 and examining mismatch values located rather in the middle of the distributions representing a medium point in density, pairing a mismatch associated with a σ of −1.46 612 from bi-modal distributions 600 with a mismatch associated with a σ of about −1.46 662 bi-modal distributions 650 results in a total separation margin of about 2.93, which is more than two times of separation of 2.7 that is obtained from the non-recursive method. Therefore, even the smallest available separation will still be two times greater than 1.35 for any given pair.

Figure 7A:
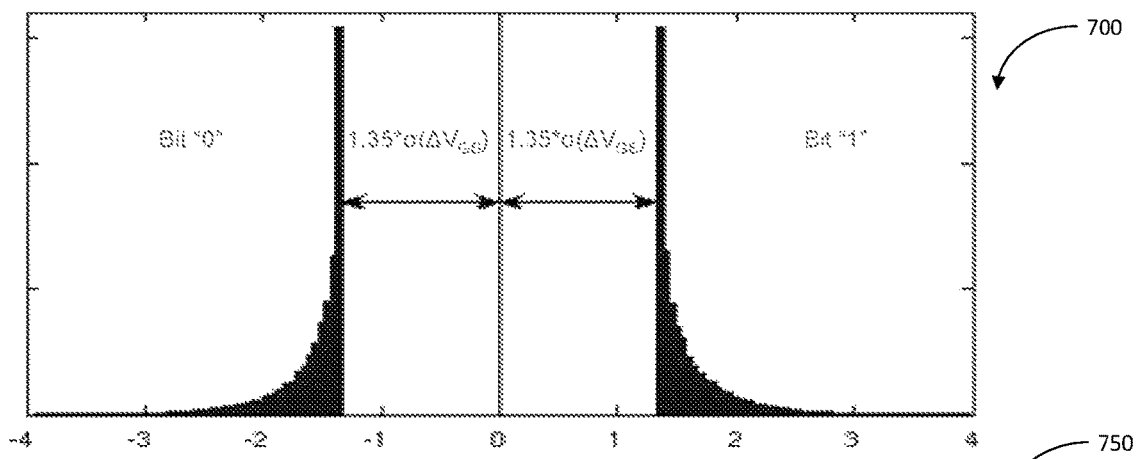
FIGS. 7A and 7B illustrate the effect of the recursive pairing in FIG. 6.
Figure 7B:
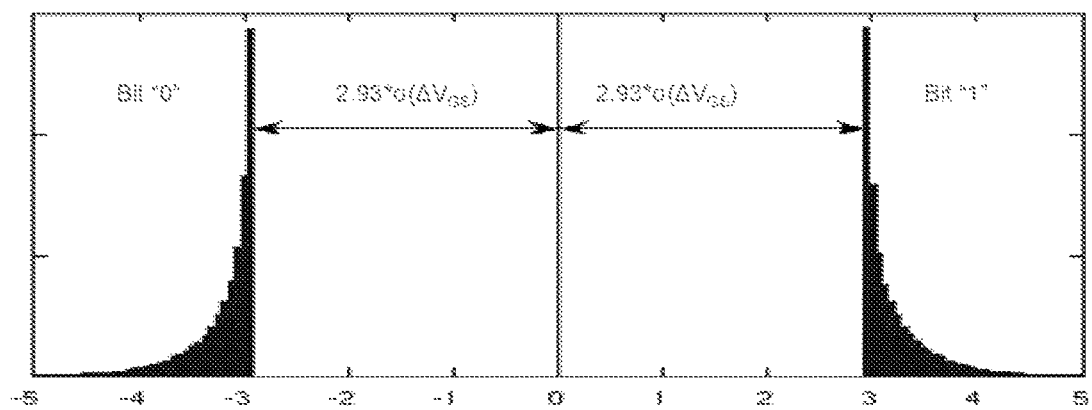

FIGS. 7A and 7B illustrate the effects of the recursive pairing in FIG. 6. FIG. 7A shows the same a bi-modal distribution 700 as in FIG. 3B that results from the non-recursive pairing when applied to a Gaussian distribution. In contrast, bi-modal distribution 750 in FIG. 7B illustrates a result that is obtained by using the system presented in FIG. 5 that applies recursive pairing. As can be seen, the random values in distribution 750 in FIG. 7B are also distributed in to a bi-modal fashion. However, the increased separation distance advantageously provides for a larger margin. Comparing empirical data from the two different pairing methods, it can be seen that the separation increases from 1.35 for non-recursive pairing in FIG. 7A to 2.93 for the recursive paring method in FIG. 7B. In other words, the separation distance more than doubles. As a result, e.g., for a 128 bit key, a failure rate of 0.4 ppb may be achieved using the recursive paring method.

Figure 8:
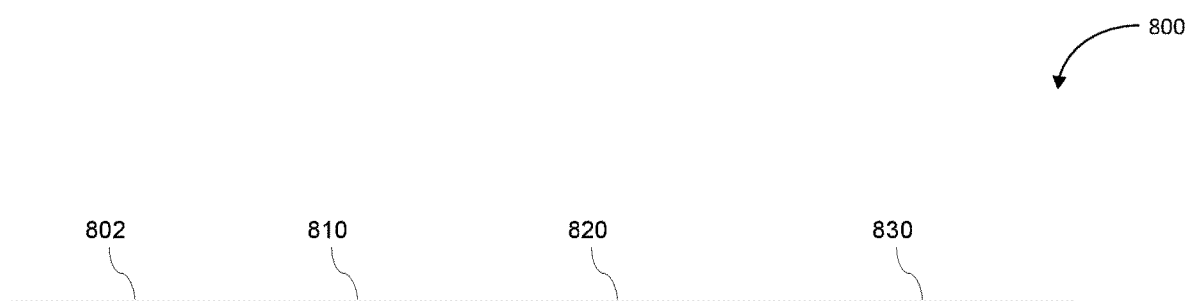
FIG. 8 shows exemplary expected error rates of PUF arrays when used according to various embodiments of the invention.

FIG. 8 shows exemplary expected error rates of PUF arrays when used according to various embodiments of the invention. Numeral N in table 800 indicates the number of exemplary 16×16 arrays used to perform non-recursive pairing, i.e., N=1, or recursive pairing, i.e., N>1, according to the embodiments of the invention. While up to 8 arrays are listed in FIG. 8, one of skill in the art will appreciate that the number of possible arrays and their combinations thereof is unlimited. Margin 810, expressed in units of 6 (AVGs), represents the achievable separation based on the given number of arrays 810. Standard deviation of total drift 820 is based on empirical data and is also expressed in units of 6 (AVGs). The value to part failure rate 830 is based on empirical data for an exemplary 128 bit key.

As FIG. 8 illustrates, when recursive pairing is extended to include multiple PUF arrays, margin 810 more than doubles each time the number of arrays 802 is doubled. This result translates directly into enhanced PUF stability and accuracy without the need for more accurate measurements. Additionally, as the number of arrays 802 doubles, the standard deviation of total drift 820 is increased by a factor of √2, and part failure rate 830 decreases accordingly, further highlighting the benefits of this highly scalable model that is based on a modular PUF array design that requires minimal or no design changes to add arrays to improve stability.

In embodiments, some or all of the functions of the modular system may be implemented in software. One having skill in the art will appreciate that accuracy may be traded for longer key length. For example, array may be added to increase the key bit length from, e.g., 128 to 256, at a constant separation. Alternatively, the bit length may be kept constant in favor of increasing the separation distance to achieve a greater margin for purposes of PUF stability and accuracy.

It is understood that the various embodiments of the invention can be applied to any physical property with a natural variation, such as threshold voltage, oscillation frequency, resistance, capacitance, etc. In one embodiment, different characteristics of element pairs are combined to create the mathematical operation (e.g., Vt mismatch and capacitance mismatch). Further, one skilled in the art will appreciate that various memory structures can be used to store the pairing information.

Figure 9:
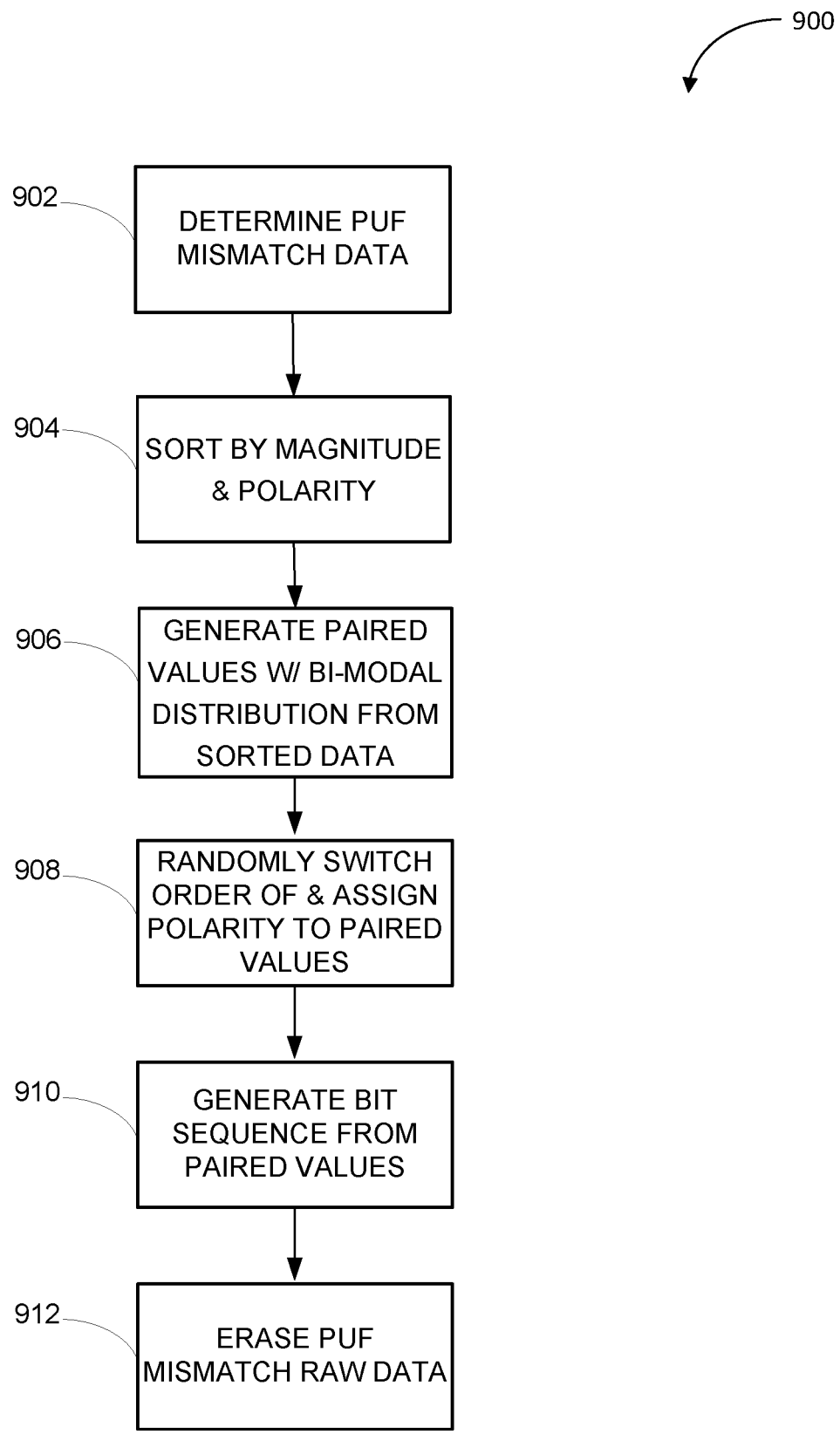
FIG. 9 is a flowchart of an illustrative process to generate pairing information according to various embodiments of the invention.

FIG. 9 is a flowchart of an illustrative process to generate pairing information, according to various embodiments of the invention. The process for generating pairing information starts at 902, "when" mismatch data is determined for two to a plurality of PUF elements.

At step 904, the mismatch data is sorted by magnitude and polarity to obtain the group of sorted mismatch data having a certain mathematical distribution.

At step 906, pairs of data are selected from the group of sorted mismatch data according to some selection mechanism so as to generate a bi-modal data distribution consisting of paired values. In embodiments, pairs may be selected from one or more bi-modal distributions that are generated by one or more PUF arrays. In embodiments, individual values of a pair may be subtracted from each other to increase a separation distance between them.

At step 908, individual values of a pair are randomly switched, and a polarity is assigned to the paired value to maintain randomness.

At step 910, the bit sequence is generated from the paired values using the bi-modal distribution data.

Finally, at step 912, the raw PUF path mismatch data is the erased from memory.

Figure 10:
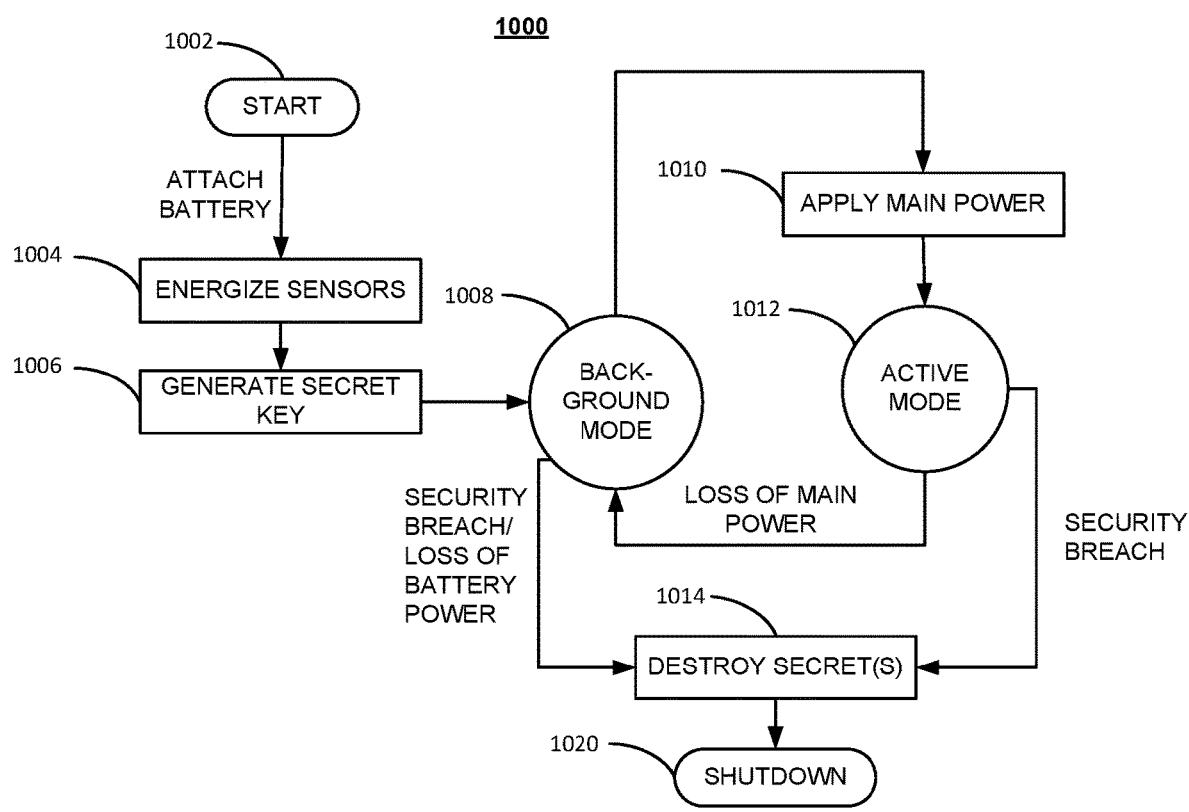
FIG. 10 is a general illustration of a conventional process for generating and using a secret key in a battery-backed up financial payment terminal.

FIG. 10 is a general illustration of a conventional process for generating and using a secret key in a battery-backed up financial payment terminal. Process 1000 for generating and using a secret key in a battery-backed payment terminal starts at step 1002, generally, as soon as a battery is attached to the payment terminal to start the life cycle. The event of the payment terminal being energized for the first time is known as its "first birthday."

At step 1004, sensors, such as motion sensors that are embedded in the payment terminal, are activated.

At step 1006, a secret key is generated and the system enters into background mode 1008 in which a backup battery activates the sensors of system 1000 without activating, at the same time, system components that are intended to process financial transactions.

In background mode 1018, the sensors are typically queried at a relatively reduced frequency mainly to conserve battery power.

Once, at step 1010, main power is applied to the payment terminal, the system enters into active mode 1012, and both sensors and system components become fully functional.

In embodiments, the system returns to background mode 1008 in response to a loss of main power, but does not perform any power-hungry operations until main power is restored, at step 1010.

If, while the system is an active mode 1012 a security breach is detected, then, at step 1014, the encryption key and/or other secrets are permanently erased from the memory device within the terminal, or the memory device is irreversibly destroyed, and the system is shut down, at step 1020. Similarly, if, while the system is in background mode 1008 and either a security breach or a loss of battery power is detected, the process deletes the key and/or other secrets, at step 1014, and shuts down the terminal, at step 1020.

In short, system 1000 cycles between background mode 1008 and active mode 1012 where the terminal actively performs tasks, unless a security breach or loss of battery power is detected, in which cases the terminal shuts down.

In practice, this process is implemented in a financial terminal that uses, for example, three power sources: 1) a USB power source, 2) a relatively large lithium battery, and 12) a coin cell. The terminal generally operates on USB power as its main source of power. Once USB power becomes temporary or permanently unavailable, the terminal switches to the lithium battery or, as a last resort, to the coin cell to continue to power the protective sensors to keep the secrets alive in volatile memory until the voltage in the coin cell falls to a level that no longer can support the protective sensors, or until the system is manually restored.

System 1000 depends on the backup battery to power active monitoring and protection circuits. Furthermore, system 1000 depends on the use of volatile memory, so that secrets can be erased quickly in the event of an intrusion attempt. Without the backup battery, the secrets would be exposed to the sophisticated attacker, who may access system 1000, perform circuit modifications without being detected, such that after the device is powered back up, there will be no trace indicating that the device has been invaded and manipulated.

Therefore, it would be desirable to have systems and methods that provide a high level of security even in scenarios of a power outage without having to rely on common battery-backed security systems.

Figure 11:
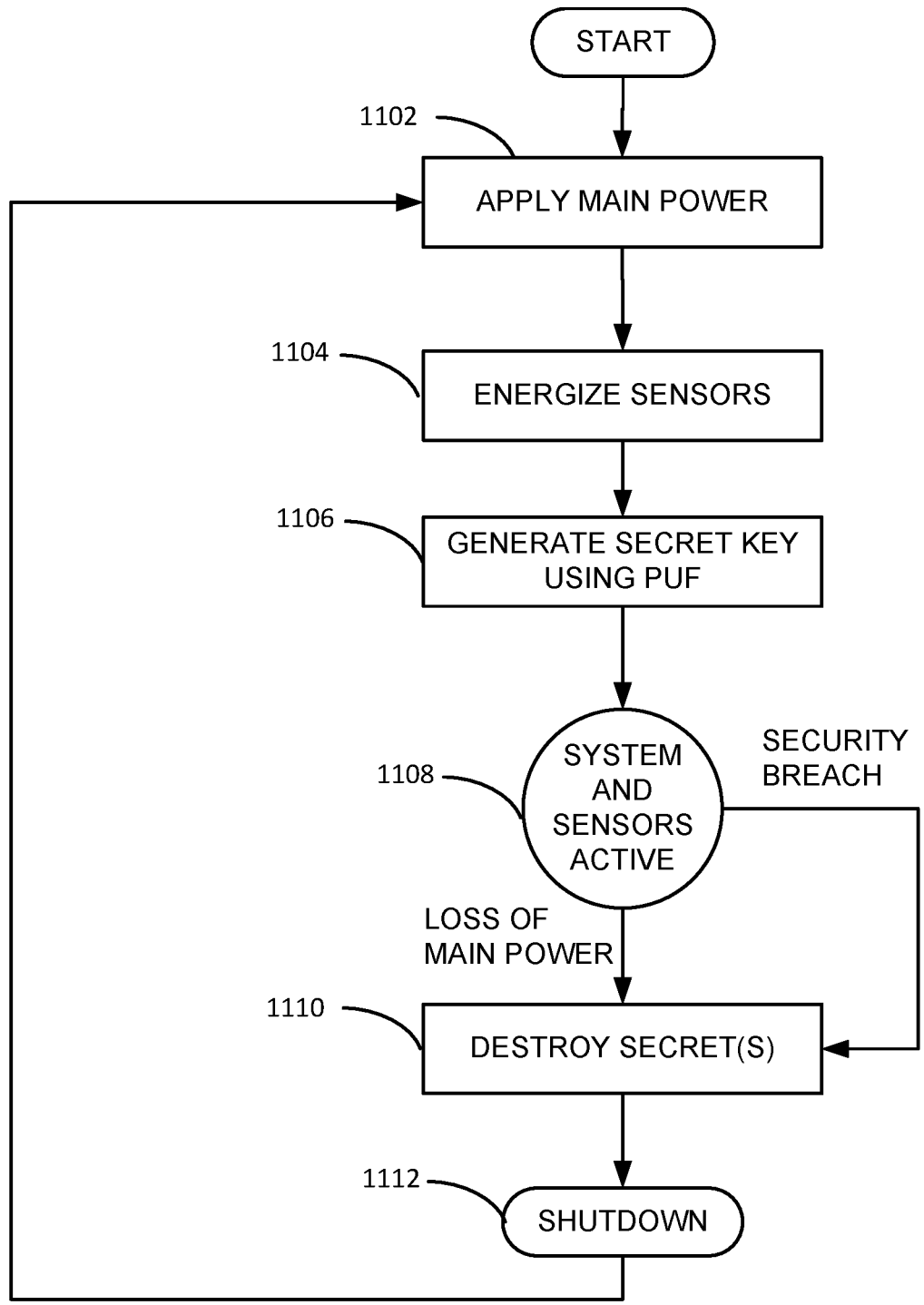
FIG. 11 is a flowchart of an illustrative process for generating and using a secret key in a secure system that does not require a battery backup, according to various embodiments of the present disclosure.

FIG. 11 is a flowchart of an illustrative process for generating and using a secret key in a secure system that does not require a battery backup, according to various embodiments of the present disclosure. Process 1100 for generating and using a secret key starts at step 1102 when main power is applied to a system, such as a financial payment terminal.

At step 1104, protective sensors that continuously monitor the system in regular operation are energized to prevent physical access to a secret key, e.g., an encryption key, that is generated, at step 1106, e.g., by using a PUF circuit or any other circuit that by design provides non-discoverable, unique, and random values that may be used as a keying source.

At step 1108, the system enters into a state at which both sensors and system components are activated. The system performs regular tasks of encryption, authentication, and the like. In embodiments, PUF-generated secret key or a derivation thereof is used, for example, to obtain information for a setup process or to decrypt encrypted information that is stored in non-volatile memory (e.g., flash memory). In this active mode 1108, a shield (e.g., an active mesh) may be used to protect data that is being transferred and available for processing in unencrypted format.

In embodiments, a second key is derived from a PUF-generated key that serves as a master key that may be used to encrypt the second key that may then be stored in non-volatile memory and, thereby, aid in minimizing the use and exposure of the master key itself.

Once a security breach, a loss of power, or the presence of a predetermined event is detected, the system may delete the key and/or secrets or the entire system may be shut down. In embodiments, the PUF circuit is physically destroyed (e.g., by applying heat), for example, after a number of attempts to compromise system security have been detected.

In embodiments, once the system is shut down at step 1112, the PUF-generated number is no longer available and, as a result, there is no key present that could be discovered, stolen, and used to access protected information.

Upon restoring main power, at step 1102, process 1100 may resume, at step 1104, with energizing the sensors and using the PUF circuit to re-generate, at step 1106, the secret key to its original value.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 12:
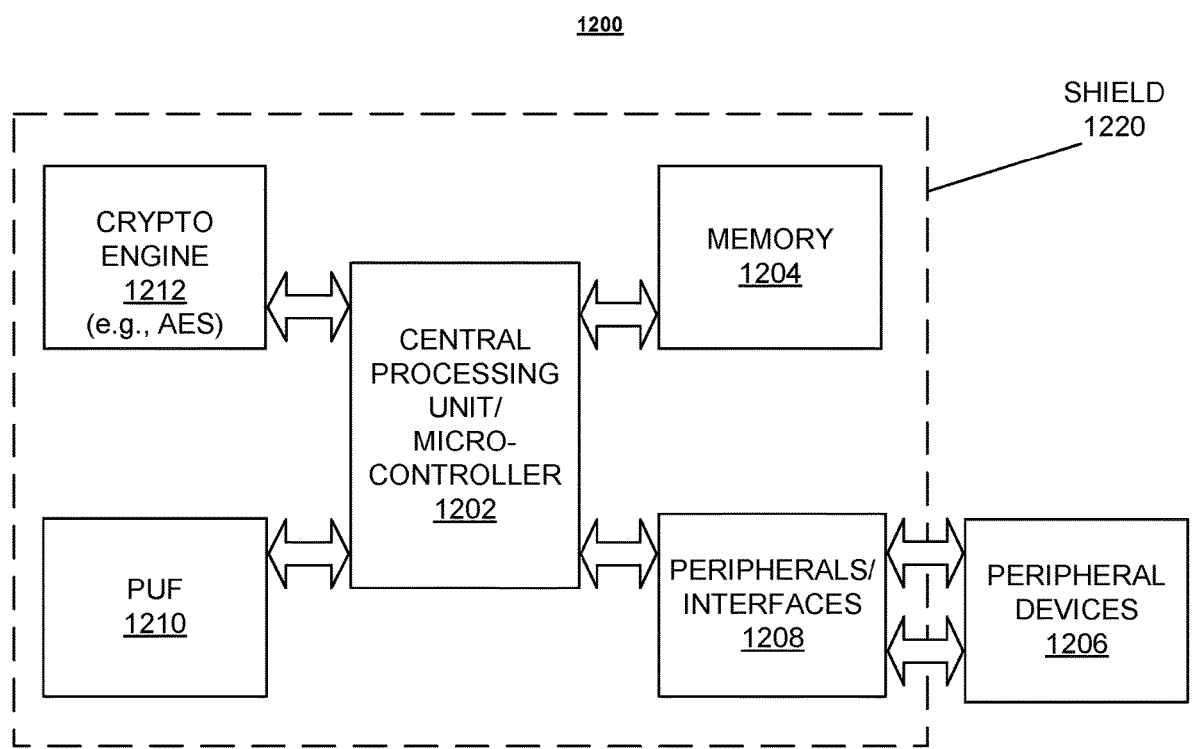
FIG. 12 depicts a block diagram of a PUF-based security system that does not require a battery backup, in accordance with embodiments of the present disclosure.

FIG. 12 depicts a block diagram of a PUF-based security system 1200 that does not require a battery backup, in accordance with embodiments of the present disclosure. System 1200 comprises processing unit 1202, crypto engine 1212, system memory 1204, peripheral interfaces 1208, Physically Unclonable Function (PUF) 1210; and shield 1220, which may be an active mesh designed to detect physical intrusion attempts into any of the devices within system 1200 that may comprise sensitive data.

It will be understood that the functionalities shown for system 1200 may operate to support various embodiments of any information handling system that may be differently configured and include different components as those shown in FIG. 12. In embodiments, system 1200 is embedded in a point-of-sale-terminal that may create, store, encrypt, authenticate, and transmit sensitive data, such as confidential payment-related banking information and encryption keys. As illustrated in FIG. 12, processing unit 1202 provides computing resources and may be implemented with any secure microcontroller known in the art. It may comprise a graphics processor and/or a floating point coprocessor for mathematical computations.

System 1200 includes Physically Unclonable Function (PUF) 1210 circuit that is integrated with system 1200. In general, a PUF takes advantage of minute but measurable manufacturing variations in physical semiconductor devices. These characteristic variations include variations in gate oxide thickness, concentrations of doping materials, and tolerances in geometrical dimensions that result from less than perfect semiconductor manufacturing processes that the semiconductor device (e.g., a MOSFET) undergoes. In various applications, the variations are used to produce sequences of random, but relatively repeatable data that may then be used to identify a device or perform other authentication functions. The repeatability of a random, device-unique number generated by existing PUFs is about 80%, which is sufficiently high for authentication applications as such level of accuracy suffices to generate a relatively unique response from the PUF circuit in that it becomes very unlikely that another PUF circuit is capable of correctly generating the same amount of bits due to the fact that a very small change at the input of a PUF circuit generates a very large change at the output. For example, changing the single bit of the circuit results in about a 50% variation in the output signal, i.e., the PUF becomes unreliable.

Further, the circuit response significantly and unpredictably changes when physical conditions (e.g., electrical conduction properties) of the PUF circuit even slightly change, e.g., after physical impact, or when the system containing the PUF circuit is probed or altered, which typically causes irreversible damage to the physical structure.

Embodiments of the present disclosure employ PUF circuit 1210 that generates a random, device-unique, but highly repeatable value (e.g., 1 ppb error rate), for example, via by using Repeatable Tightly Coupled Unique Identification Elements. Unlike in existing designs, this highly repeatable value may be a number that can be used to reliably and repeatably generate a cryptographic key.

In embodiments, the key or secret is stored in a volatile memory device (not shown in FIG. 12) that may be internal or external or external to any of the components shown in FIG. 12. The volatile memory holds the key that, upon system 1200 detecting a power outage, is automatically deleted as the volatile memory need not be supported by a battery backup system or another source of alternative energy in the event mains power is interrupted. As a result of there being no key present, unlike prior art designs, no protection and no battery is needed.

In embodiments, cryptographic engine 1212 may implement any strong cryptographic algorithm recognized by one of skill in the art, e.g., symmetric algorithms, such as Advanced Encryption Standard, or public key cryptography, such as RSA or Elliptic Curve Cryptography. It is understood that cryptographic engine 1212 may process a secret together with other data or software to provide functional protection.

In embodiments, rather than relying on software, cryptographic engine 1212 is implemented as a hardware engine that performs cryptographic operations, such as data encryption, data decryption and integrity checks. The hardware engine may facilitate increased reaction to fault attacks and enhanced performance for data encryption or decryption.

In embodiments, a PUF-generated key is loaded into and stored in cryptographic engine 1212. Upon detection of a security breach, e.g., a tamper attempt, the key is instantly erased from volatile memory. The presented embodiments advantageously also eliminate the need to store keys in non-volatile memory and, thus, renders system 1200 immune to reverse engineering and other advanced methods by sophisticated attackers not further discussed herein.

System 1200 may include system memory 1204, which may be random-access memory (RAM) and read-only memory (ROM). It is noted that any part of system 1200 may be implemented in an integrated circuit. Any number of controllers and peripheral devices 1206 may be provided, as shown in FIG. 12.

Peripheral interfaces 1208 represent interfaces to various input device(s), such as a keyboard, mouse, or stylus. System 1200 may also include a storage controller for interfacing with one or more storage devices each of which includes a storage medium such as magnetic tape or disk, or an optical medium that might be used to record programs of instructions for operating systems, utilities and applications which may include embodiments of programs that implement various aspects of the present invention. Storage device(s) may also be used to store processed data or data to be processed in accordance with the invention. System 1200 may also include a display controller for providing an interface to a display device, which may be a cathode ray tube (CRT), a thin film transistor (TFT) display, or other type of display. The computing system 1200 may also include a printer controller for communicating with a printer. A communications controller may interface with one or more communication devices, which enables system 1200 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 1260, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A secure system for protecting sensitive data without using a backup energy source, the secure system comprising:
a crypto-engine that uses one of a secret key or a private key to process sensitive data;
a Physically Unclonable Function (PUF) circuit coupled to the crypto-engine, the PUF circuit configured to:
generate a plurality of paired values from paired mismatch data having one or more bi-modal distributions, the paired mismatch data being paired by sorting mismatch data; and
generate the secret key or the private key by applying a mathematical operation to each pair of the plurality of paired values; and
a volatile memory coupled to the PUF circuit, the volatile memory stores the secret key or the private key,
wherein the crypto-engine is configured to encrypt the sensitive data using the secret key or private key;
wherein the secure system, in response to a first security breach being detected, is configured to destroy the secret key or the private key by de-energizing the PUF circuit, and
wherein the PUF circuit is configured to, in response to power to the PUF circuit being restored, re-generate the secret key or the private key.

2. The secure system according to claim 1, further comprising one or more sensors configured to detect at least one of a tampering attempt and a physical attack on the secure device.

3. The secure system according to claim 1, further comprising a shield that protects data that is being transferred in an unencrypted format.

4. The secure system according to claim 3, wherein the shield is an active mesh.

5. The secure system according to claim 1, wherein the secure device is a financial payment terminal.

6. The secure system according to claim 1, further comprising a non-volatile memory device that stores a second key.

7. The secure system according to claim 1, wherein the PUF circuit generates a response that is random.

8. The secure system according to claim 1, further comprising a heat source that, in response to detecting a second security breach, destroys the PUF circuit.

9. The secure system according to claim 1, wherein the paired values are paired recursively to generate the one or more bi-modal distributions.

10. The secure system according to claim 1, wherein the mismatch data is sorted by magnitude and polarity.

11. A method for protecting sensitive data in a secure device having no backup energy source, the method comprising:
generating a plurality of paired values from paired mismatch data having one or more bi-modal distributions, the paired mismatch data being paired by sorting mismatch data;
generating, by a Physically Unclonable Function (PUF) circuit, a secret key or a private key by applying a mathematical operation to each pair of the plurality of paired values;
storing, by a volatile memory coupled to the PUF circuit, the secret key or private key;
in response to detecting a first security breach, destroying secret or private key by de-energizing the PUF circuit;
upon power being restored, re-generating, by the PUF circuit, the secret or private key; and
encrypting, by a crypto-engine, the sensitive data using the secret key or private key.

12. The method according to claim 11, further comprising using the secret or private key to generate a second secret or private key.

13. The method according to claim 12, further comprising storing the secret or private key in a volatile memory device and the second secret or private key in a non-volatile memory device.

14. The method according to claim 11, wherein the PUF circuit generates a response that is random.

15. The method according to claim 11, further comprising, in response to detecting a second security breach, destroying the PUF circuit.

16. The method according to claim 11, wherein the paired values are paired recursively to generate the one or more bi-modal distributions.

17. A secure device having no backup energy source, the secure device comprising:
a Physically Unclonable Function (PUF) circuit configured to:
generate a plurality of paired values from paired mismatch data having one or more bi-modal distributions, the paired mismatch data being paired by sorting mismatch data; and
generate a secret key or a private key by applying a mathematical operation to each pair of the plurality of paired values; and
a volatile memory coupled to the PUF circuit, the volatile memory stores the secret or private key;
wherein the secure device, in response to a first security breach being detected, is configured to destroy the secret or private key;
wherein the PUF circuit is configured to, in response to power to the PUF circuit being restored, re-generates the secret or private key by de-energizing the PUF circuit; and
wherein the secure device is configured to encrypt sensitive data using the secret key or private key.

18. The secure device according to claim 17, wherein, in response to detecting a second security breach, the PUF circuit is physically destroyed.

19. The secure device according to claim 18, wherein the PUF circuit is physically destroyed by applying heat to the PUF circuit in response to a second security breach being detected.

20. The secure device according to claim 17, wherein the secure device is a financial payment terminal.

* * * * *